US011065803B2

(12) United States Patent
Tanabe

(10) Patent No.: US 11,065,803 B2
(45) Date of Patent: Jul. 20, 2021

(54) PREFORM CONVEYING DEVICE, PREFORM CONVEYING METHOD, AND BLOW MOLDING DEVICE

(71) Applicant: NISSEI ASB MACHINE CO., LTD., Komoro (JP)

(72) Inventor: Yoshiaki Tanabe, Komoro (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 1056 days.

(21) Appl. No.: 15/513,863

(22) PCT Filed: Sep. 17, 2015

(86) PCT No.: PCT/JP2015/076522
§ 371 (c)(1),
(2) Date: Mar. 23, 2017

(87) PCT Pub. No.: WO2016/047557
PCT Pub. Date: Mar. 31, 2016

(65) Prior Publication Data
US 2017/0282436 A1    Oct. 5, 2017

(30) Foreign Application Priority Data

Sep. 24, 2014   (JP) .............................. JP2014-193784

(51) Int. Cl.
*B29C 49/42*         (2006.01)
*B29C 49/06*         (2006.01)
(Continued)

(52) U.S. Cl.
CPC .......... *B29C 49/4205* (2013.01); *B29C 49/42* (2013.01); *B29C 49/4215* (2013.01);
(Continued)

(58) Field of Classification Search
CPC .. B29C 49/4205; B29C 49/42; B29C 49/4215
See application file for complete search history.

(56) References Cited

U.S. PATENT DOCUMENTS 3,744,032 A * 7/1973 Engelberger ........... B25J 9/0093
                                                      700/159
5,853,775 A    12/1998 Oas et al.
(Continued)

FOREIGN PATENT DOCUMENTS

CN    103124627 A    5/2013
CN    103240863 A    8/2013
(Continued)

OTHER PUBLICATIONS

Extended European Search Report issued in corresponding European Application No. 15844448.9, dated May 22, 2018.
(Continued)

*Primary Examiner* — Joseph S Del Sole
*Assistant Examiner* — John Robitaille
(74) *Attorney, Agent, or Firm* — Greenblum & Bernstein, P.L.C.

(57) ABSTRACT

A preform conveying device (100) of the invention includes a control unit that detects an arriving time at which a conveyor jig arrives at a reference position based on an output of a first encoder, and commands a second motor to move a conveyor arm to a target position at regular intervals from the arriving time. The target position in each command is a position obtained by adding, to a current position of the conveyor jig which is obtained based on a latest output of the first encoder which was obtained when the command has been issued, a moving distance by which the conveyor jig has advanced during a delay time T which spans from a time when the latest output is outputted from the first encoder to a time when the command is received by the second motor.

8 Claims, 10 Drawing Sheets

(51) Int. Cl.
  *B29C 49/64* (2006.01)
  *B29C 49/18* (2006.01)
  *B29L 31/00* (2006.01)
(52) U.S. Cl.
  CPC ............ *B29C 49/06* (2013.01); *B29C 49/185* (2013.01); *B29C 49/4236* (2013.01); *B29C 49/6409* (2013.01); *B29C 2049/4221* (2013.01); *B29C 2949/7826* (2013.01); *B29C 2949/78042* (2013.01); *B29C 2949/78554* (2013.01); *B29C 2949/78773* (2013.01); *B29L 2031/716* (2013.01)

(56) References Cited

U.S. PATENT DOCUMENTS

| | | |
|---|---|---|
| 2011/0056809 A1 | 3/2011 | Borgatti et al. |
| 2013/0241118 A1* | 9/2013 | Sato .................. B29C 49/4215 264/535 |

FOREIGN PATENT DOCUMENTS

| | | |
|---|---|---|
| CN | 2013110311 U | 8/2013 |
| JP | 10-264240 | 10/1998 |
| WO | WO 2012/046620 | 4/2012 |

OTHER PUBLICATIONS

International Search Report from the European Patent Office for International Application No. PCT/JP2015/076522, dated Nov. 15, 2015.

Notification of First Office Action issued by the China National Intellectual Property Administration in corresponding China Application No. 201580051364.5, dated Aug. 2, 2018.

* cited by examiner

PREFORM CONVEYING DEVICE, PREFORM CONVEYING METHOD, AND BLOW MOLDING DEVICE

TECHNICAL FIELD

The present invention relates to a preform conveying device, a preform conveying method, and a blow molding device.

BACKGROUND ART

In a two-stage or cold parison blow molding device, preforms at a room temperature are heated to a temperature suitable for blowing, whereafter the preforms are blow-molded into containers. In blow molding devices of this type, there is a blow molding device in which preforms are transferred from conveyor jigs which are conveyed continuously along a heating conveyor path to conveyor arms, and the conveyor arms are intermittently conveyed in both directions between a heating process and a blow molding process (Patent Reference 1).

PRIOR ART REFERENCE

Patent Reference

Patent Reference 1: International Publication No. 2012/046620

SUMMARY OF THE INVENTION

Problem that the Invention is to Solve

For preforms to be transferred from the conveyor jigs, which are continuously conveyed, to the conveyor arms, the conveyor arms have to be conveyed so as to face the conveyor jigs which are being conveyed continuously. In Patent Reference 1, rods (engaging members 320A) provided on the conveyor arms which are stopped in a waiting position are driven forwards towards projections (engaged members 208A) provided on link plates of a chain which conveys the conveyor jigs, so that the rods are brought into mechanical engagement with the projections. Then, the conveyor arms are conveyed so as to face the conveyor jigs by a predetermined stroke (a stroke L3 shown in FIG. 5 of Patent Reference 1) which is necessary for the preforms to be transferred to the conveyor arms. The conveyer arms are conveyed by the rods which are pushed to the projections which move together with the conveyor jigs (FIG. 7 of Patent Reference 1).

With the mechanical engagement described above, however, the wear of the engaging members and the engaged members is unavoidable, and hence, the engaging members and engaged members have to be replaced as consumables. In case the degree of wear increases as a result of failing to replace the engaging and engaged members, the other mechanical parts may also be damaged.

The conveyor arms, which receive the preforms from the conveyor jigs, are released from the mechanical engagement with the chain and are then conveyed to a transfer position in the next step by a motor (a moving stroke L2 in FIG. 5 of Patent Reference 1). The conveyor arms, which now convey nothing after the preforms have been transferred, are conveyed back by a return distance L2 by the motor. However, in order to further convey the conveyor arms by the stroke L3 so as to return to the waiting position, other drive sources or mechanisms than the motor are necessary (members 310B, 310C, 311, 311A, 320, 322 shown in FIG. 6 of Patent Reference 1).

According to some aspects of the invention, an object is to provide a preform conveying device, a preform conveying method, and a blow molding device in which a conveyor arm can be conveyed so as to face a conveyor jig which is continuously conveying a preform, without requiring a mechanical engagement member that causes wear of relevant parts and a drive mechanism for conveying back the conveyor arm.

Means for Solving the Problem (1) An aspect of the invention is related to a preform conveying device including:
  a continuous conveyor section that continuously conveys a conveyor jig which supports a preform along a heating conveyor path;
  an intermittent conveyor section that intermittently conveys a conveyor arm between a first position and a second position along a direction which is parallel to the heating conveyor path, the preform being transferred from the conveyor jig to the conveyor arm during the conveying of the conveyor arm; and
  a control unit that controls the intermittent conveyor section so that the conveyor arm which was waiting in the first position can catch up with the conveyor jig which is being conveyed continuously,
  wherein the continuous conveyor section includes a first motor which applies conveying force to the conveyor jig and a first encoder which detects a rotational angle of the first motor,
  wherein the intermittent conveyor section includes a second motor which applies conveying force to the conveyor arm, and
  wherein the control unit detects an arriving time at which the conveyor jig arrives at a reference position facing the first position based on an output of the first encoder, and commands the second motor to move the conveyor arm to a target position at regular intervals from the arriving time, the target position in each command being a position obtained by adding, to a current position of the conveyor jig which is obtained based on a latest output of the first encoder which was obtained when the command has been issued, a moving distance by which the conveyor jig has advanced during a delay time which spans from a time when the latest output is outputted from the first encoder to a time when the command is received by the second motor.

According to the one aspect of the invention, the control unit detects the arriving time at which the conveyor jig arrives at the reference position facing the first position (the conveyor arm waiting position) based on an output of the first encoder which detects the rotational angle of the first motor driving the conveyor jig, and commands the second motor to move the conveyor arm to the target position at regular intervals from the arriving time. The target position is a current position of the conveyor jig which is a target with which the conveyor arm catches up. This current position of the conveyor jig is obtained based on the latest output of the first encoder which was obtained when the command has been issued. Consequently, there is a communication delay time which occurs from a time when the latest output is obtained from the first encoder until the time when the control unit receives it. In addition, there is a processing delay time or a communication delay time which occurs from after the control unit receives the latest output from the first encoder until the second motor receives the command from the control unit. Consequently, the target position of the conveyor arm is set as the position obtained by adding, to the current position of the conveyor jig, the moving distance by which the conveyor jig has advanced during the total of the delay times. In this way, the conveyor arm can be conveyed so as to face the conveyor jig which is continuously conveying the preform, without requiring the mechanical engagement member that causes the wear of relevant parts and the drive mechanism for conveying back the conveyor arm.

(2) In the aspect of the invention, the control unit may calculate the moving distance by multiplying a constant time corresponding to the delay time by a speed of the conveyor jig. Here, the delay time can be set in advance, and the delay time is constant in the event that the communication time between the first encoder and the control unit, the processing time at the control unit, and the communication time between the control unit and the second motor are also constant. Additionally, the speed of the conveyor jig can also be measured, and in the event that the speed varies, the average speed can be used.

(3) In the aspect of the invention, the continuous conveyor section may further include: an endless chain conveying the conveyor jig and in which a plurality of links are connected; and a drive sprocket driven by the first motor and meshing with the endless chain, and a distance over which the endless chain moves from the reference position during a synchronously driving period, which is a period during which the conveyor arm staying in the first position is caused to catch up with the conveyor jig by the command, may be set less than one fourth of a link length which is a length between supporting points of one link.

Here, in the event that the continuous conveyor section includes the endless chain and the drive sprocket, since a longitudinal direction of the link of the chain intersects a straight-line running path during the time when the engagement of the link with the drive sprocket moves from a crest to a crest (or a trough to a trough) of the drive sprocket, the speed of the chain varies like a sine wave. However, since the speed of the conveyor jig which is used for calculation of the moving distance is the speed during the synchronously driving period, the speed variation of the conveyor jig becomes small in the event that the synchronously driving period is short. Additionally, the meshing relationship between the endless chain and the drive sprocket is determined uniquely based on the device. In the event that the distance over which the chain moves from the reference position during the synchronously driving period is set less than one fourth of the link length which is the length between the supporting points of one link of the endless chain, at least one of the two peaks of the sine wave indicating the speed variation lies out of the synchronously driving period. Consequently, the speed variation of the conveyor jig becomes small, whereby the conveyor arm can be controlled more accurately to move to the target position. The distance over which the chain moves from the reference position during the synchronously driving period can preferably be set at one fifth or smaller to one eighth or smaller of the link length which is the length between the supporting points of one link of the endless chain.

(4) In the aspect of the invention, the control unit may calculate the moving distance based on an average speed of the endless chain during the synchronously driving period. As has been described above, in the event that the speed variation of the chain during the synchronously driving period is made small, a speed error becomes small even if the average speed of the chain during the synchronously driving period is used, thereby making it possible to perform a more accurate position control.

(5) In the aspect of the invention, the conveyor jig may include a conveying table which is capable of moving up and down and which support the preform in an inverted state where a mouth portion of the preform is facing downwards. The intermittent conveyor section may include a forward-backward drive portion which drives the conveyor arm to move forward and backward with respect to the conveying table, and a timing at which the synchronously driving period ends may be set to be after the conveyor arm has been moved forward by the forward-backward drive portion to hold the mouth portion of the preform and when the conveying table is lowered.

The preform is transferred completely from the conveyor jig to the conveyor arm after the conveyor arm holds the mouth portion of the preform and when the conveying table is lowered. By setting the timing at which the synchronously driving period ends at the timing when the conveying table is lowered, the conveyor arm can be kept being conveyed to face the conveyor jig until the preform is transferred completely to the conveyor arm. In the event that the conveying speed of the conveyor arm is set to become faster after the synchronously driving period ends, there is no such situation that the conveyor arm comes into interference with the following preform (conveyor jig) after the conveyor arm has received the preform.

(6) In the aspect of the invention, the control unit may control the intermittent conveyor section during an additional synchronously driving period which is a period from after the end of the synchronously driving period to when the conveyor arm is moved backward by the forward-backward drive portion, and the moving distance in a command outputted from the control unit during the additional synchronously driving period may be calculated based on the average speed of the endless chain during the synchronously driving period.

In the event that the additional synchronously driving period, which is a period from after the end of the synchronously driving period to when the conveyor arm which has received the preform is moved rearward, is set, since the conveyor arm is moved to face the conveyor jig even while the conveyor arm is moved backward, there is no such situation that the conveyor arm comes into interference with the following preform (conveyor jig) after the conveyor arm has received the preform. At this time, the speed variation of the chain during the total period of the synchronously driving period and the additional synchronously driving period is greater than the speed variation of the chain during the synchronously driving period. Due to this, the moving distance in the command outputted from the control unit during the additional synchronously driving period is calculated based on the average speed of the chain during the synchronously driving period. Even in this way, the conveyor arm can be moved to substantially face the conveyor jig over the additional synchronously driving period. By doing so, even if a preform remains on a preceding conveyor jig on the heating conveyor path, no problem is caused to the intermittent conveyor path of the conveyor arm which is moved backward. Consequently, the preform which remains on the heating conveyor path due to a transfer failure does not come into interference with the preform which is conveyed intermittently while being held by the conveyor arm.

(7) In the aspect of the invention, the intermittent conveyor section may further include a second encoder for that detects a rotational angle of the second motor. The control unit may start a transfer operation of transferring the preform from the conveyor jig to the conveyor arm when a distance between a position of the transfer jig which is obtained based on a latest output from the first encoder and a position of the conveyor arm which is obtained based on a latest output from the second encoder becomes a predetermined value or smaller.

Whether or not the conveyor arm has caught up with the conveyor jig can be determined by determining whether or not the distance between the position of the conveyor jig and the position of the conveyor arm becomes the predetermined value or smaller. Even if the transfer operation of transferring the preform from the conveyor jig to the conveyor arm is started, if it is after the determination has been made that the conveyor arm has caught up with the conveyor jig, there is no risk of a transfer failure being caused.

(8) Another aspect of the invention is related to a blow molding device including the preform conveying device according to any one of the above-described (1) to (7). According to the blow molding device, the heated preform can be conveyed smoothly to the blow molding section, and the mechanical engagement member that causes the wear of relevant parts and the drive mechanism for conveying back the conveyor arm are not required.

(9) A further another aspect of the invention is related to a preform conveying method including:
a first step of continuously conveying a conveyor jig which supports a preform along a heating conveyor path by using driving force of a first motor;
a second step of intermittently conveying a conveyor arm between a first position and a second position along a direction which is parallel to the heating conveyor path by using driving force of a second motor; and
a third step of transferring the preform from the conveyor jig to the conveyor arm during the conveying of the conveyor arm,
wherein the second step includes a synchronously driving step of causing the conveyor arm which was waiting in the first position to catch up with the conveyor jig which is being conveyed continuously,
wherein the synchronously driving step includes:
a step of detecting an arriving time at which the conveyor jig arrives at a reference position facing the first position based on an output of a first encoder which detects a rotational angle of the first motor; and
a step of commanding the second motor to move the conveyor arm to a target position at regular intervals from the arriving time, and
wherein the target position in each command is a position obtained by adding, to a current position of the conveyor jig which is obtained based on a latest output of the first encoder which was obtained when the command has been issued, a moving distance by which the conveyor jig has advanced during a delay time which spans from a time when the latest output is outputted from the first encoder to a time when the command is received by the second motor.

Also in the preform conveying method according to the further other aspect of the invention, the conveyor arm can be conveyed to face the conveyor jig which is continuously conveying the preform, without requiring the mechanical engagement member that causes the wear of relevant parts and the drive mechanism for conveying back the conveyor arm.

MODE FOR CARRYING OUT THE INVENTION

Hereinafter, a preferred embodiment of the invention will be described in detail by reference to a comparison example. It should be noted that an embodiment which will be described below does not limit unreasonably the details of inventions which are described in the claims, and that all of the configurations which will be described in this embodiment are not necessarily essential to the means for solving the problem according to the invention.

1. Preform Conveying Device and Blow Molding Device

Figure 1:
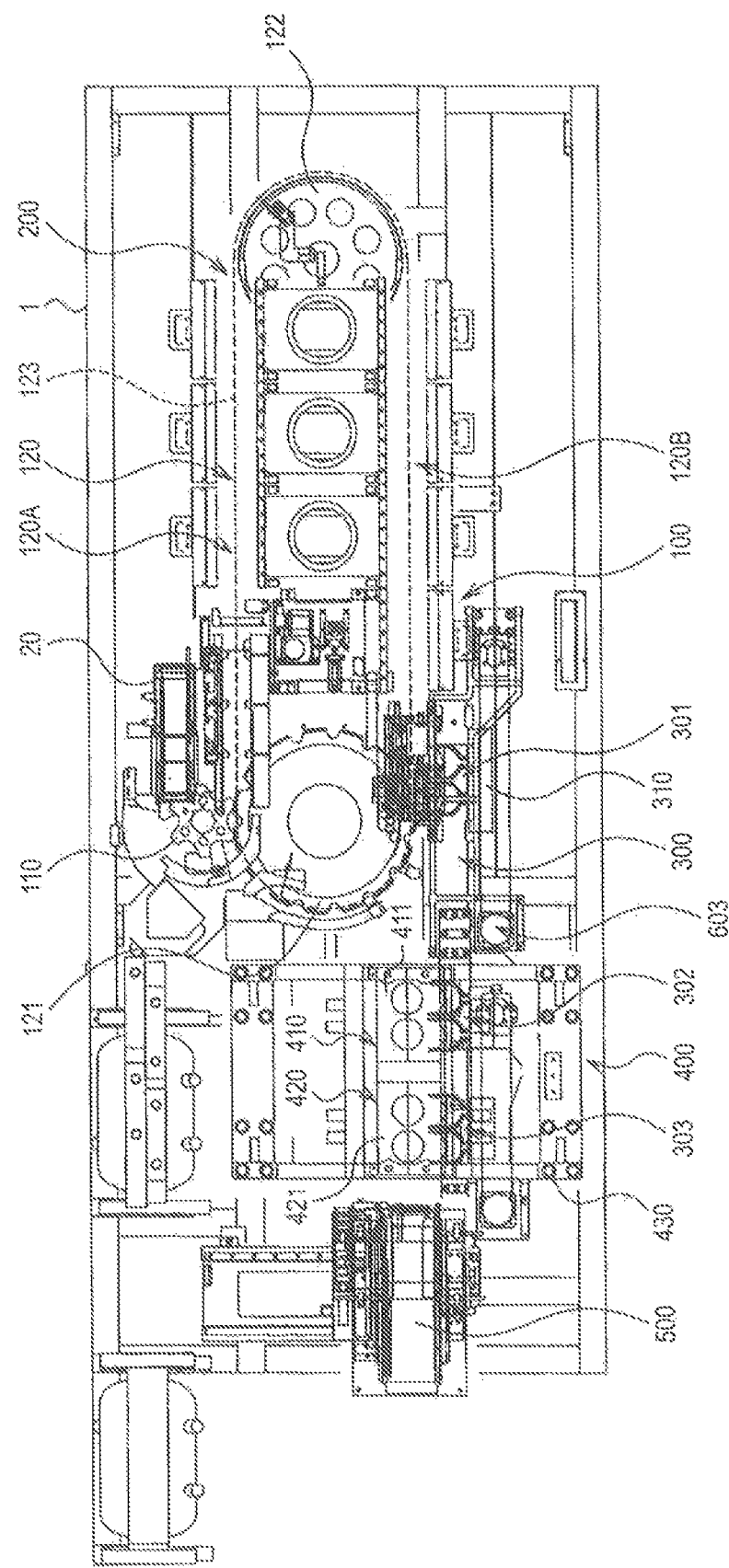
FIG. 1 is a schematic plan view of a blow molding device which includes a preform conveying device.

A preform conveying device 100 of this embodiment is configured as part of a cold parison blow molding device 1, for example, shown in FIG. 1. The blow molding device 1 receives preforms such as wide-mouthed preforms 10 which are supplied from the outside thereof, heats the received wide-mouthed preforms 10, and then blow-molds the wide-mouthed preforms 10 into containers such as wide-mouthed containers.

Figure 2:
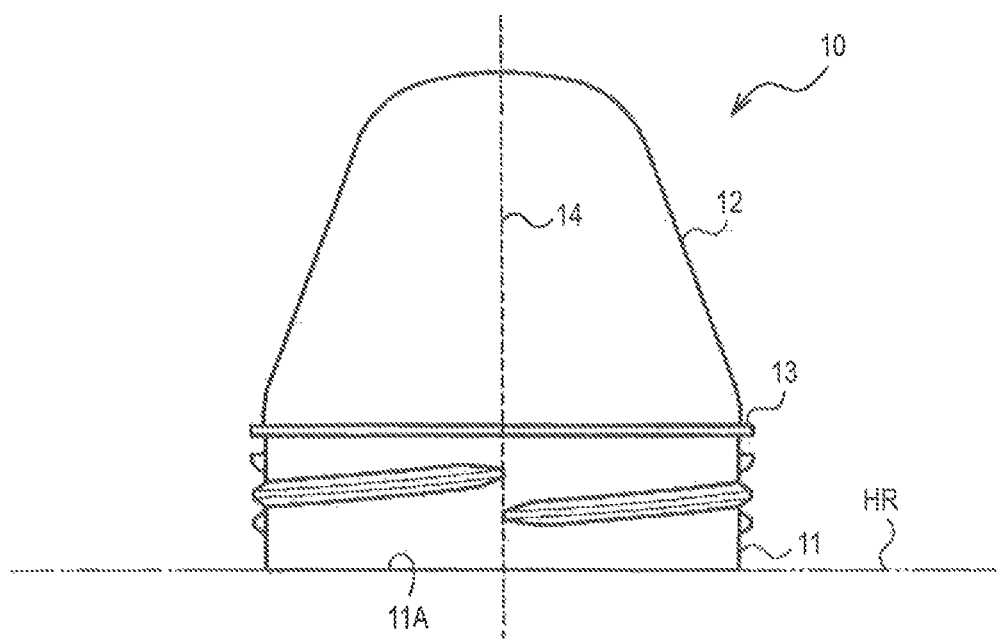
FIG. 2 is a schematic illustrative drawing which illustrates an inverted state of a wide-mouthed preform.

As shown in FIG. 2, the wide-mouthed preform 10 includes a mouth portion 11 which is relatively large with respect to a body portion 12, and hence, the wide-mouthed preform 10 can stand alone on a horizontal plane HR in an inverted posture. Threads are formed on an outer circumferential surface of the mouth portion 11, and a flange 13 is formed on the wide-mouthed preform 10 in a position which lies away from an open end face 11A of the mouth portion 11, for example, at an boundary between the mouth portion 11 and the body portion 12 so as to project radially outwards. A center axis 14 of the inverted preform 10 is perpendicular to the horizontal plane HR.

Wide-mouthed preforms 10, which are injection-molded in advance, are supplied to the blow molding device 1 via a shooter 20 which is an external device attached to the blow molding device 1. The wide-mouthed preforms 10 are supplied continuously in one row from an exit of the shooter 20 and are then separated one by one by a rotating star wheel 110 to be delivered to the blow molding device 1.

The blow molding device 1 has a heating section (a continuous conveyor section) 200 which includes a heating conveyor path 120, an intermittent conveyor section 300, and a blow molding section 400. The heating section 200 continuously conveys the body portions 12 of the wide-mouthed preforms 10 in an inverted state where the mouth portions 11 are facing downwards along the endless heating conveyor path 120 to be heated. In the blow molding section 400, N (N is a natural number, and in this embodiment, N=2) wide-mouthed preforms 10 are blow-molded into containers simultaneously in an erected state where the mouth portions 11 are facing upwards. The intermittent conveyor section 300 intermittently conveys N wide-mouthed preforms 10 from the heating section 200 to the blow molding section 400. The preform conveying device 100 is made up of the heating section (the continuous conveyor section) 200, the intermittent conveyor section 300 and a control unit 600 (which will be described later in relation to FIG. 7).

In blow-molding heat-resistant containers, the blow molding section 400 can include a primary blow molding portion 410 and a secondary blow molding portion 420. In the primary blow molding portion 410, N preforms 10 in an erected state are blow-molded primarily in a primary blow mold 411, and N primary blow-molded pieces are heated in the primary blow mold 411 which is heated. The N primary blow-molded pieces, which are removed from the primary blow mold 411 to be shrunk, are blow-molded secondarily in an erected state in a secondary blow mold 421 of the secondary blow molding portion 420 and are heated in the secondary blow mold 421 which is heated, whereby N final molded articles (secondary blow-molded articles) having heat-resisting properties are formed. In this embodiment, a mold clamping mechanism 430 is commonly used for the primary blow mold 411 and the secondary blow mold 421. The blow molding device 1 can further include a removing section 500 where the N final molded articles in the erected state are removed from the secondary blow mold 421.

2. Preform Conveying Device

Next, the heating section (the continuous conveyor section) 200 and the intermittent conveyor section 300 which are included in the preform conveying device 100 will be described.

2.1 Heating Section

Figure 3:
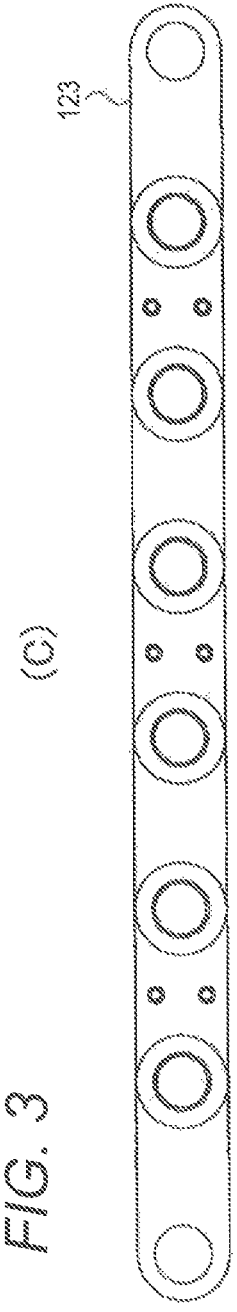
FIGS. 3(A), 3(B) and 3(C) are a front view, a side view and a plan view of conveyor jigs which are attached to a chain, respectively.
Figure 3:
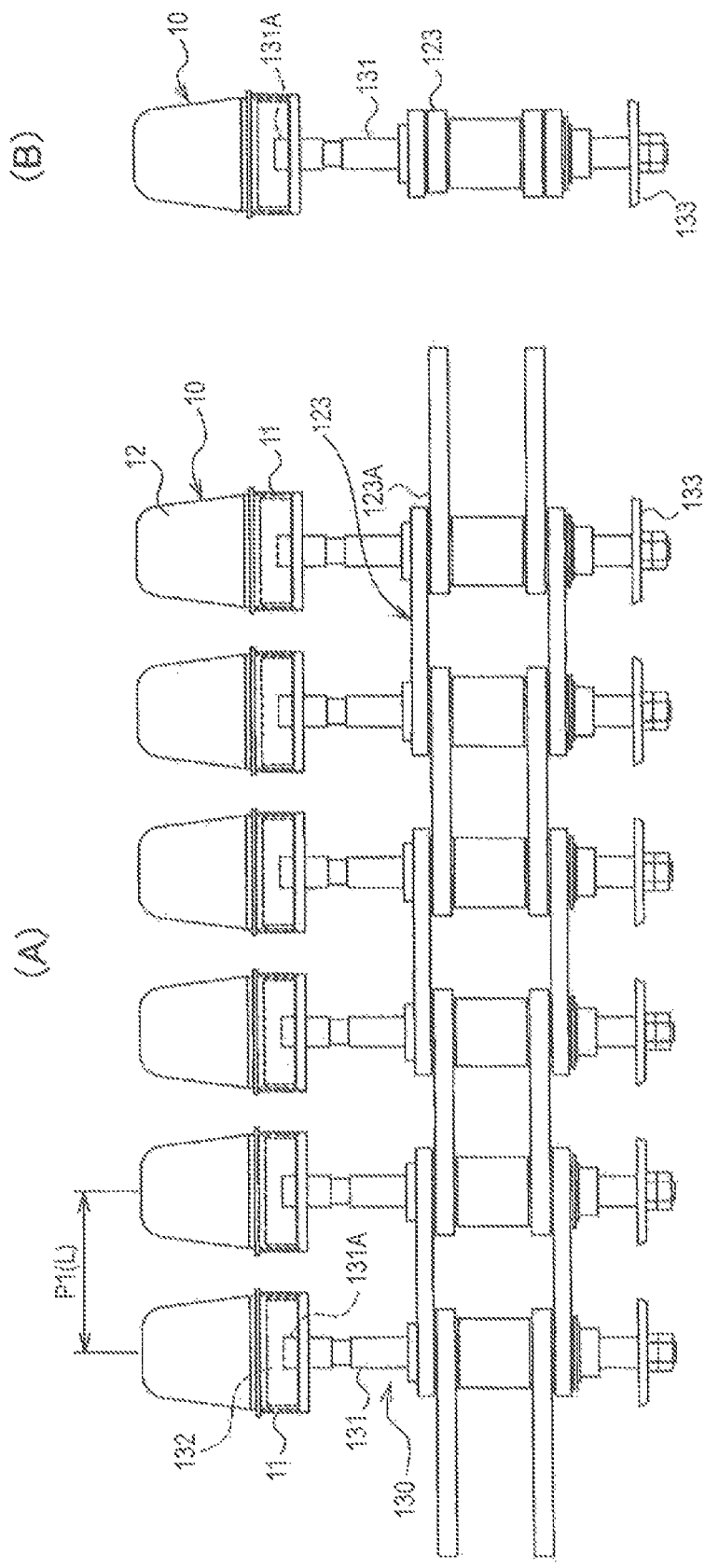

The heating (the continuous conveyor section) 200 includes a heating conveyor path 120. The heating conveyor path 120 has an endless chain 123 which is stretched between first and second sprockets 121, 122 so as to be wound therearound. As shown in FIG. 3(A), conveyor jigs 130 configured to support wide-mouthed preforms 10 in an inverted state are fixed to links 123A which configure the chain 123 at a first pitch P1. In FIG. 3(A), a link length L between supporting points of one link 123A is equal to the first pitch P1.

The conveyor jigs 130 each have a conveying table 132 at an upper end of a rotational shaft 131 thereof which is supported on the chain 123 so as to be rotatable about its own axis. This conveying table 132 is fitted in a downward opening which is formed in a mouth portion 11 of a wide-mouthed preform 10, so that the wide-mouthed preform 10 is placed on the conveying table 132.

As shown in FIGS. 3(A), 3(B), the upper end of the rotational shaft 131 can be made into a bolt 131A. In this case, the conveying table 132 has the bolt 131A and a nut. Alternatively, a method may be adopted in which a bolt fastening nut hole is provided at the upper end of the rotational shaft 131, so that the conveying table 132 is connected to the rotational shaft 131 by the bolt 131A. By doing so, in blow-molding preforms 10 having mouth portions 11 of a different size, conveying tables 132 matching the size of the mouth portions of preforms 10 to be blow-molded can be connected to the rotational shafts 131 to replace the existing conveying tables 132.

In this embodiment, in the conveyor jig 130, a rotational driving member such as a circular disc (a frictional plate) 133 is fixed to a lower end of the rotational shaft 131 to rotate the rotational shaft 131 on its own axis. In order to more reliably perform the rotational of the rotational shaft 131, a normally used sprocket may be used as a substitute for the circular disc 133.

Figure 4:
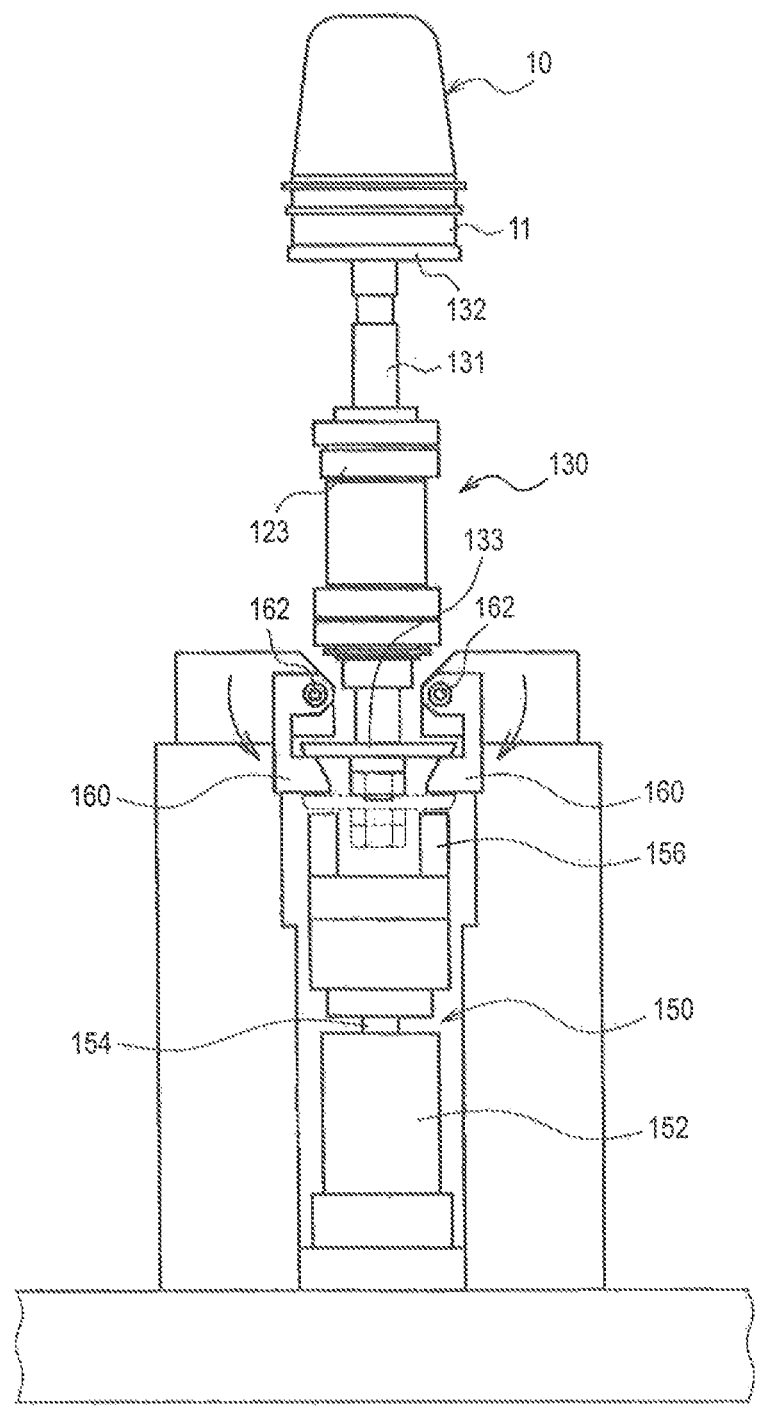
FIG. 4 is a drawing showing a push-up mechanism of the conveyor jig.

In this embodiment, a push-up mechanism 150 of the conveyor jig 130 shown in FIG. 4 is provided, for example, on a line which connects a center of the star wheel 110 and a center of the first sprocket 121, which are shown in FIG. 1, and directly below the conveyor path of wide-mouthed preforms 10. This push-up mechanism 150 pushes up one of a plurality of conveyor jigs 130 which are conveyed by the chain 123 so that part of the conveyor jig 130 so pushed up is fitted into a mouth portion 11 of a preform 10 in an inverted state.

As shown in FIG. 4, the push-up mechanism 150 has a push-up portion 156 which is fixed to a rod 154 which is pushed up and down by, for example, an air cylinder 152. The push-up portion 156 pushes up a circular disc 133 provided at a lower end of the conveyor jig 130, whereby the whole of the conveyor jig 130 is pushed up. The wide-mouthed preform 10 is held on to the conveyor jig 130 which is partially fitted therein as a result of the circular disc 133 being pushed up from a position indicated by a chain line to a position indicated by a solid line FIG. 4.

The circular disc 133 which is pushed up by the push-up portion 156 moves on the push-up portion 156 while sliding thereon as the conveyor jig 130 is conveyed. For example, movable contact portions 160 can also be disposed on the heating conveyor path 120 in a position which has passed the push-up portion 156. In this case, the circular disc 133 which is pushed up by the push-up portion 156 moves on the push-up portion 156 while sliding thereon as the conveyor jig 130 is conveyed and is then guided to a fixed contact portion 222 (refer to FIG. 5) by way of the two movable contact portions 160 shown in FIG. 4.

Figure 5:
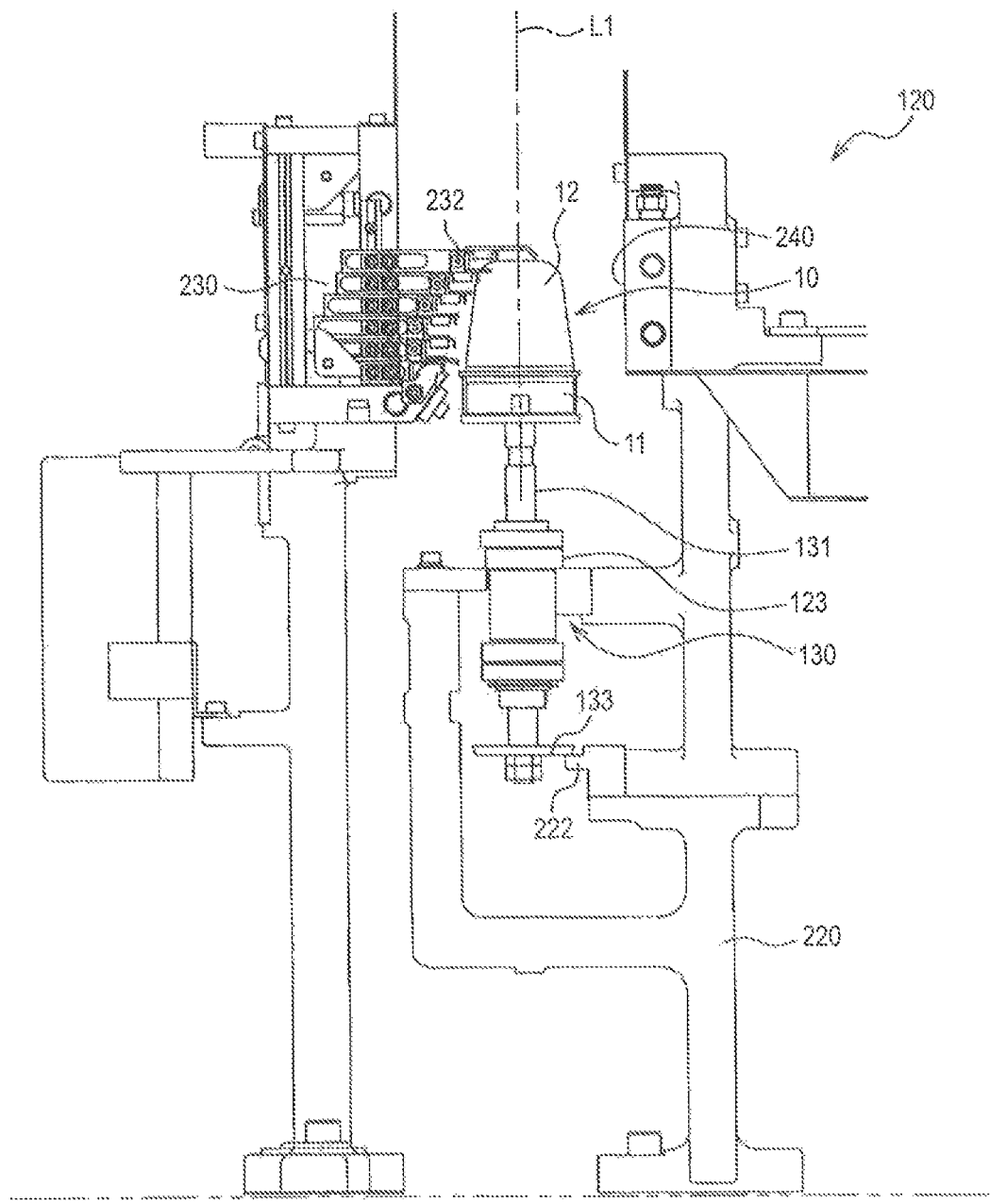
FIG. 5 is a sectional view of a heating section (a straight-line conveyor section).

The heating conveyor path 120 of the heating section (the continuous conveyor section) 200 has a first straight-line conveyor path 120A on an upstream side and a second straight-line conveyor path 120B on a downstream side (FIG. 1). The heating conveyor path 120 (the first and second straight-line conveyor paths 120A, 120B) includes a heating mechanism shown in FIG. 5 disposed therealong. As shown in FIG. 5, as the heating mechanism, a heater portion 230 and a reflecting portion 240 are provided on a frame 220. The heater portion 230 is disposed on one side of a center line L1 of the heating conveyor path 120 and the reflecting portion 240 is disposed on the other side of the center line L1. The heater portion 230 has a plurality of rod-shaped heaters 232 which are disposed in different positions in a vertical direction to the heat body portions 12 of the preforms 10. Additionally, the fixed contact portion 222 is formed on the frame 220 so as to be brought into contact with a lower surface of the circular disk 133 of the conveyor jig 130. When the conveyor jig 130 which holds the wide-mouthed preform 10 is conveyed in a perpendicular direction to a surface of a sheet of paper on which FIG. 5 is drawn by the chain 123, a frictional plate which is conveyed together with the conveyor jig 130, for example, the circular disc 133 is brought into frictional contact with the fixed contact portion 222, whereby rotational force is applied to the circular disc 133 by the contact portion 222, and a rotational shaft 131 which is supported on the chain 123 so as be rotatable about its own axis is caused to rotate about its own axis.

Heat radiation from the heater portion 230 and heat radiation resulting from the heat radiation reflected on the reflecting portion 240 are incident on the wide-mouthed preforms 10 which are conveyed along the heating conveyor path 120 while rotating on their own axes, whereby the body portions 12 of the wide-mouthed preforms 10 can be heated wholly uniformly.

2.2 Intermittent Conveyor Section

The intermittent conveyor section 300 has N first conveyor arms 301, N second conveyor arms 302, and N third conveyor arms 303 which move along an arm running portion provided parallel to the second straight-line conveyor path 120B. The first conveyor arms 301 which receive the inverted wide-mouthed preforms 10 from the heating conveyor path 120 are turned 180 degrees by a reversing portion 310 to be put in a properly erected state where open end faces 11A of the wide-mouthed preforms 10 are facing upwards. A driving mechanism for the first conveyor arms 301 differs from a driving mechanism for the second and third conveyor arms 302, 303. Each driving mechanism includes a drive pulley which is rotated by a motor and a driven pulley, and a belt is stretched between the drive pulley and the driven pulley so as to be wound therearound. The first conveyor arms 301 are fixed to a first belt and are driven in a reciprocating fashion between the heating conveyor path 120 and the primary flow molding portion 410. The second and third conveyor arms 302, 303 are fixed to a second belt, whereby the second conveyor arms 302 are driven to reciprocate between the primary and secondary blow molding portions 410, 420, and the third conveyor arms 303 are driven to reciprocate between the secondary blow molding portion 420 and the removing section 500. The second conveyor arms 302 and the third conveyor arms 303 are driven to reciprocate by the same distance.

The N first conveyor arms 301 are driven to move forward and backward by a forward-backward drive portion 605 during the first conveyor arms 301 being driven to be conveyed by a second motor 603, which will be described in relation to FIG. 6. On the N first conveyor arms 301, two chuck pieces are biased in a normally closed direction by a spring. When the N first conveyor arms 301 are caused to move forward towards the heating conveyor path 120, the chuck pieces on the N first conveyor arms 301 are brought into abutment with mouth portions 11 of corresponding preforms 10 to be forced to open, whereby the mouth portions 11 can be chucked by the chuck pieces.

On the other hand, on the heating conveyor path 120, the circular discs 133 are supported on the fixed contact portion 222 shown in FIG. 5, whereby the conveyor jigs 130 are conveyed with the conveying tables 132 which hold the preforms 10 being held in a raised position. However, the fixed contact portion 222 does not exist in an area extending from an upstream area to a downstream area of the drive sprocket 121. Thus, the conveying tables 132 of the conveyor jigs 130 are lowered in the area where the fixed contact portion 222 does not exist. The conveying tables 132 of the conveyor jigs 130 are lowered upstream of the position where the preforms 10 are held by the N first conveyor arms 301. By doing so, the preforms 10 are transferred from the conveyor jigs 130 to the first conveyor arms 301, whereafter the preforms 10 are conveyed to a blow molding position through a normal conveyance of the first conveyor arms 301. This normal conveyance drive may be performed either before or after the first conveyor arms 302 are driven to move backward by the forward-backward drive portion 605 shown in FIG. 6.

The N first conveyor arms 301 which receive the wide-mouthed preforms 10 from the heating section 200 may be fixed at the first pitch P1 (a heating pitch=a blow molding pitch), or the pitch may be changed to a second pitch P2 (a blow molding pitch) which is larger than the first pitch P1, The pitch of the second and third conveyor arms 302, 303 are fixed at the first pitch P1 or the second pitch P2 depending upon the pitch of the first conveyor arms 301. In the case of a wide-mouthed container molding machine on which a high production volume is not required, it is desirable to adopt the pitch-fixed method since the mechanical configuration is simplified, leading to low cost. For example, two conveyor arms can be fixed to the first to third conveyor arms 301 to 303. Two conveyor arms can be used in the event that two containers need to be blow-molded simultaneously, while only one conveyor arm can be used in the event that one container is blow-molded at one time. This is also similar for the conveyor jigs 130 of the heating section 200. In the event that two wide-mouthed containers are produced simultaneously, the preforms 10 are disposed on the conveyor jigs 130 without any space left (P1=L), while in the event that only one wide-mouthed container is produced at one time, the preforms 10 are disposed on every other conveyor jig 130 (P1=2L). At this time, it is preferable to change a conveying speed V of the conveyor jigs 130 as required in consideration of the size of the preforms 10 to be conveyed.

3. Control System of Preform Conveying Device

Next, a control system of the preform conveying device 100 will be described. FIG. 6 is a block diagram of a control system of the preform conveying device 100. It should be noted that relative sizes of mechanical elements 121, 123A in FIG. 6 are different from actual ones. Additionally, although a conveying control will be described on one (N=1) first conveyor arm 301 in an example from FIG. 6 and after, a conveying control on a plurality of first conveyor arms 301 will be the same. In FIG. 6, the control unit 600 is provided which governs the control of the preform conveying device 100. The heating section (the continuous conveyor section) 200 includes a first motor 601 which is a continuous drive source of the drive sprocket 121 and a first encoder 602 which detects a rotational angle of the first motor 601. The intermittent conveyor section 300 includes a second motor 603 which is an intermittent drive source of the first conveyor arm 301, a second encoder 604 which detects a rotational angle of the second motor 603, and the forward-backward drive portion of the first conveyor arm 301, for example, an air cylinder 605. A drive mechanism of the first conveyor arm 301 includes a drive pulley 606 which is rotated by the second motor 603 and a driven pulley 607, and a belt 608 is stretched between the pulleys 606, 607 so as to be wound therearound. The first conveyor arm 301 and the forward-backward drive portion 605 are fixed to the belt 608 so as to be driven to reciprocate (intermittently driven) between a first position (a waiting position) which lies opposite to the heating conveyor path 120 and the blow molding position (a second position) of the primary blow molding portion 410.

The control unit 600 controls the driving of the second motor 603 based on outputs from the first and second encoders 602, 604 and controls the conveyor arm which is waiting in a stop position so as to catch up with the conveyor jig which is being conveyed continuously (this control is referred to as a synchronously driving control). A period where the synchronously driving control is performed is referred to as a synchronously driving period T1, and an operation step during the synchronously driving period T1 is referred to as a synchronously driving step. in addition, the control unit 600 can control the forward and backward drive of the first conveyor arm 301 based on outputs from the first and second encoders 602, 604.

3.1 First Embodiment

Figure 7:
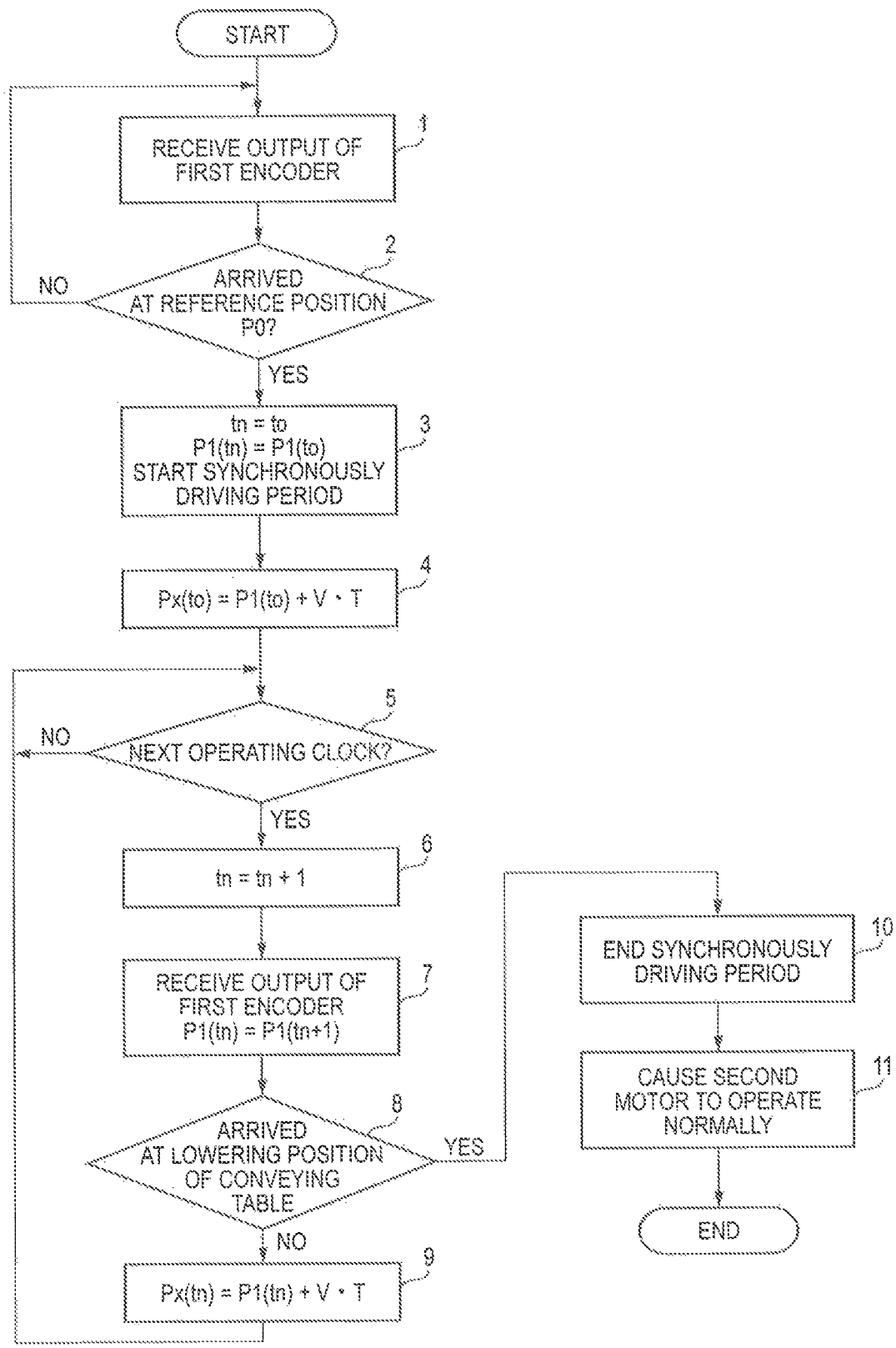
FIG. 7 is a flow chart of operations performed during a synchronously driving period.

FIG. 7 is a flow chart showing a first embodiment of the synchronously driving control. in accordance with a predetermined operating clock (for example, one cycle is approximately 3 ms), the control unit 600 receives outputs from the first and second encoders 602, 604 and outputs commands to the second motor 603 and the forward-backward drive portion 605. The first motor 601 rotates continuously at a constant speed.

In FIG. 7, in accordance with the operating clock, the control unit 600 receives an output of the first encoder 602 (step 1). It is determined whether or not a current position of the conveyor jig 130 which is obtained based on the output of the first encoder 602 (the rotational angle of the first motor 601) has reached a reference position P0 which corresponds to the waiting position (the first position) of the first conveyor arm 301 shown in FIG. 6 (step 2 in FIG. 7). Step 1 in FIG. 7 is repeated until the determination in step 2 becomes YES.

Figure 6:
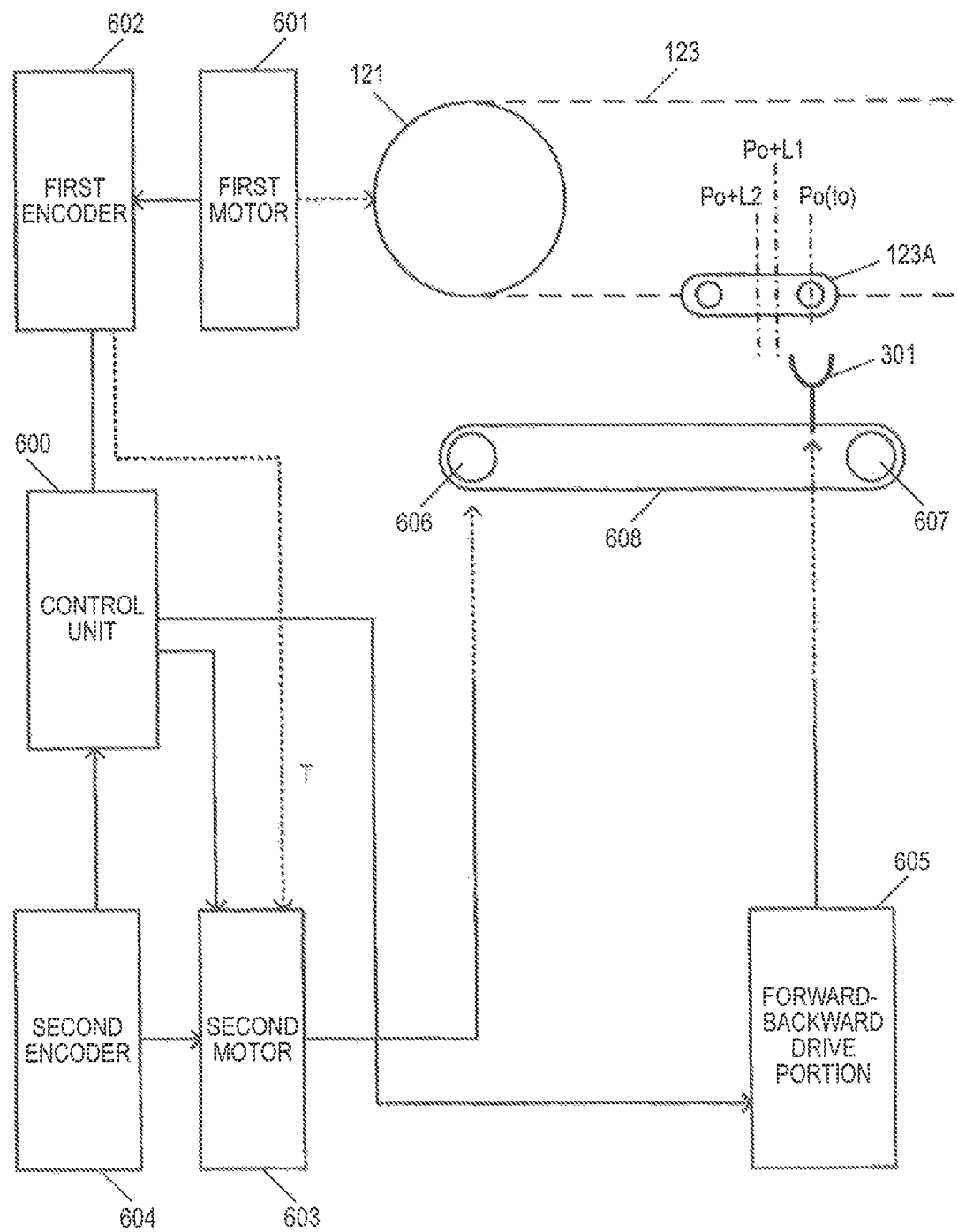
FIG. 6 is a block diagram of a control system of the preform conveying device.

The control unit 600 starts a synchronously driving period T1 when the current position of the conveyor jig 130 has reached the waiting position (the first position) P0 of the first conveyor arm 301 shown in FIG. 6 (YES in step 2), and defines the operating clock when the start of the synchronously driving period T1 is determined as time t0 (step 3 in FIG. 7). Additionally, a current position P1 ($t0$) of the conveyor jig 130 which is obtained based on the output of the first encoder 602 at the time t0 is referred to as the reference position P0, that is, P1 ($t0$)=P0. A current position of the conveyor jig 130 or the first conveyor arm 301 from this point on is a position which is defined by a distance from the reference position P0 in FIG. 6. The starting position of the synchronously driving period T1 is the reference position P0, and an ending position of the synchronously driving period T1 is referred to as a distance L1 from the reference position P0 (refer to FIG. 8, which will be described later). This is because in this embodiment, the position on the heating conveyor path 120 where the conveyor jig 130 is lowered is set to lie the distance L1 from the reference position P0 and the ending position of the synchronously driving period T1 is referred to as the position where the conveyor jig 130 is lowered.

Next, the control unit 600 commands a target position Px(tn) (a first target position is Px(t0)) which the conveyor arm 301 should reach at the operating clock at time t0 to the second motor 603 (step 4 in FIG. 7). The first target position Px(t0) is P1($t0$)+V·T, where V denotes the speed of the conveyor jig 130 during the synchronously driving period T1. In the event that the speed of the conveyor jig 130 changes during the synchronously driving period T1, the speed of the conveyor jig 130 can be referred to as an average speed of the conveyor jig 130 during the synchronously driving period T1. T shown in FIG. 6 is a delay time. The delay time T can be measured in advance, and in case a communication time between the first encoder 602 and the control unit 600, a processing time of the control unit 600 and, a communication time between the control unit 600 and the second motor 603 are constant, the delay time T is also constant.

Next, the speed V will be studied. The speed V of the conveyor jig 130 during the synchronously driving period T1 can be regarded as constant in the event that there is caused neither slip nor extension or contraction in a flat belt in, for example, a driving method using pulleys and the flat belt. However, in this embodiment, the heating section (the continuous conveyor section) 200 has the endless chain 123 which is made up of the plurality of links 123A which are connected to one another and the drive sprocket 121 which is driven by the first motor 601 to mesh with the endless chain 123 to convey the conveyor jig 130.

Figure 8:
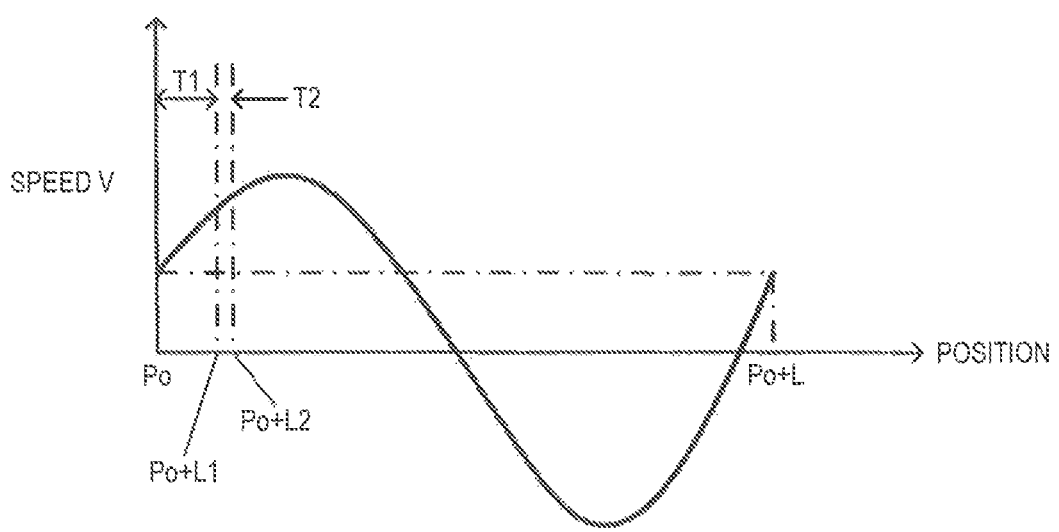
FIG. 8 is a characteristic drawing showing a change in speed of the conveyor jig.

A connecting angle between one link 123A which starts meshing with the drive sprocket 121 and another link 123A of the endless chain 123 which follows the one link 123A changes gradually, and therefore, the speed V of the conveyor jig 130 which connects to each link 123A varies. This variation in speed V is shown in FIG. 8, which is a characteristic drawing showing a variation in speed of the conveyor jig. FIG. 8 shows a variation in speed V over the time during which the conveyor jig 130 moves by a link length L defined between supporting points of one link 123A of the endless chain 123. As shown in FIG. 8, during one link 123A of the endless chain 123 engaging to the crest to crest (or a trough to trough) of the teeth of the drive sprocket 121, the speed V of the conveyor jig 130 varies like a sine wave. Here, a meshing relationship between the endless chain 123 and the drive sprocket 121 depends on the heating conveyor path 120 and is determined uniquely for each preform conveying device 100. Thus, the characteristics of the speed V in FIG. 8 are determined uniquely.

On the other hand, the distance L1 over which one link 123A of the endless chain 123 moves from the reference position PU during the synchronously driving period T1 can be shortened depending upon the speed V. As shown in FIG. 8, for example, the distance L can be set less than one fourth of the link length L (in this embodiment, L is approximately 130 mm) which is defined by the supporting points of one link 123A of the endless chain 123, By doing so, at least one of two peaks of the sine wave showing the variation in speed lies out of the synchronously driving period T1. Consequently, the variation in speed V of the conveyor jig 130 during the synchronously driving period T1 becomes small, whereby the first conveyor arm 301 can be controlled to move more accurately to the target position by the command described above. The distance L1 over which the chain moves from the reference position PU during the synchronously driving period T1 can preferably be set at one fifth or smaller to one eighths or smaller of the link length L which is the length between the supporting points of one link 123A of the endless chain 123 (in this embodiment, several tens of millimeters or smaller to ten-odd millimeters or smaller), In this embodiment, the length of the synchronously driving period T1 is of the order of 10 ms.

If the next operating clock is inputted (YES in step 5 in FIG. 7), tn is updated to tn+1 in step 6 in FIG. 7. In accordance with the next operating clock, the control unit 600 receives an output of the first encoder 602 (step 7 in FIG. 7). The control unit 600 updates the position P1($tn$) of the conveyor jig 130 to P1($tn$+1)=P1($t1$) by the latest output of the first encoder 602 (step 7 in FIG. 7).

Next, the control unit 600 determines whether or not the current position P1($tn$) of the conveyor jig 130 has reached a lowering position (a position shown in FIG. 8 which is the reference position P0+the distance L1) of the conveying table 132 where the conveying table 132 is detached from the mouth portion 11 of the preform 10 (step 8 in FIG. 7).

Next, if the determination made in step 8 in FIG. 7 is NO, the control unit 600 sends a command instructing the next target position Px(tn)=Px(t1) which the first conveyor arm 301 should reach at an operating clock at time t1 to the second motor 603 (step 9 in FIG. 7). The target position Px(tn) is P1(*tn*)+V·T. On this point on, the synchronously driving control returns to step 5 in FIG. 7, and steps 5 to 9 shown in FIG. 7 are repeated until the determination made in step 8 in FIG. 7 becomes YES.

If the determination made in step 8 in FIG. 7 becomes YES, the synchronously driving period T1 ends (step 10 in FIG. 7). Then, the control unit 600 switches the operation of the second motor 603 to the normal operation described above (the conveying operation towards the blow molding section 400) (step 11 in FIG. 7).

Figure 9:
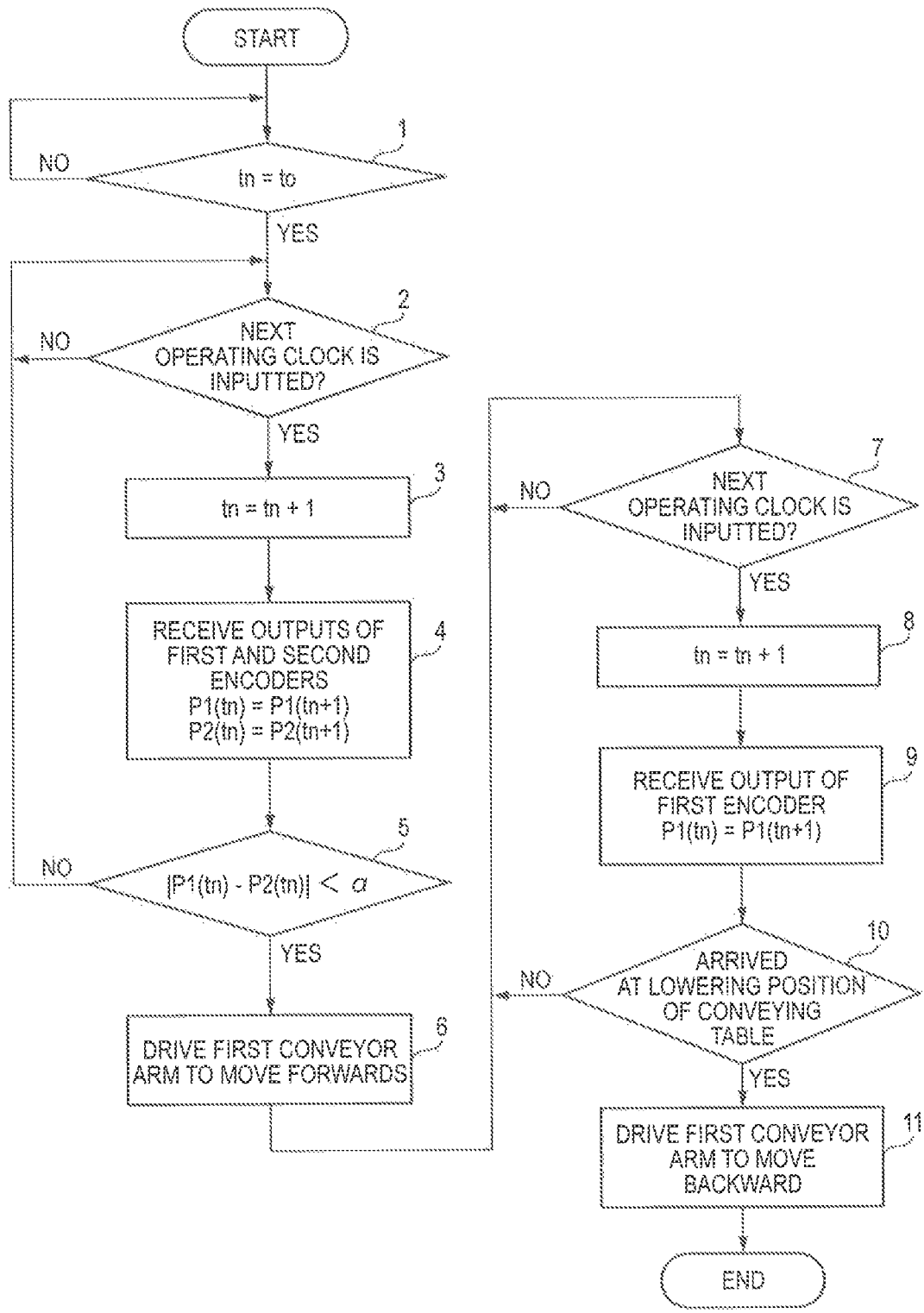
FIG. 9 is a flow chart of operations performed during a forward-backward driving of a first conveyor arm.

FIG. 9 is a flow chart of operations performed by the control unit 600 to control the forward-backward drive portion 605. Firstly, the control unit 600 determines whether or not the determination made in step 3 in FIG. 7 becomes YES whereby the synchronously driving period T1 during which tn=t0 is realized has been started (step 1 in FIG. 9). Thereafter, if an operating clock after time t0 is inputted (step 5 in FIG. 7 and step 2 in FIG. 9 are YES), tn is updated to tn+1 in step 3 in FIG. 9 (tn=t1 in a first step 3 in FIG. 9). Following an operating dock at time t1, the control unit 600 receives outputs of the first and second encoders 602, 604 (step 4 in FIG. 9). The current position P1(*tn*) of the conveyor jig 130 becomes P1(*t*1) (P1(*tn*)=P1(*t*1)) by the latest output of the first encoder 602. The current position P2(*tn*) of the first conveyor arm 301 becomes P2(*t*1)(P2(*tn*)=P2(*t*1)) by the latest output of the second encoder 604.

Next, the control unit 600 determines whether or not an absolute value of a difference in distance between the current position P1(*tn*) of the conveyor jig 130 and the current position P2(*tn*) of the first conveyor arm 301 becomes less than a threshold α (step 5 in FIG. 9). If |P1(*tn*)−P2(*tn*)|≥α (the determination made in step 5 in FIG. 9 is NO), steps 2 to 5 in FIG. 9 are repeated.

If |P1(*tn*)−P2(*tn*)|<α (the determination made in step 5 in FIG. 9 is YES), the control unit 600 instructs the forward-backward drive portion 605 to drive the first conveyor arm 301 to move forwards. Namely, since the first conveyor arm 301 has caught up with the conveyor jig 130, a transfer operation of transferring the preform 10 from the conveyor jig 130 to the conveyor arm 301 is started.

Thereafter, if an operating clock is inputted (step 7 in FIG. 9 is YES), tn is updated to tn+1 in step 8 in FIG. 9. In accordance with the operating clock at time tn, the control unit 600 receives an output of the first encoder 602 (step 9 in FIG. 9). The current position P1(*tn*) of the conveyor jig 130 is updated to P1(*tn*+1) by the latest output of the first encoder 602.

Next, the control unit 600 determines whether or not the obtained current position P1(*tn*) of the conveyor jig 130 has reached the lowering position (the position of the reference position P0+the distance L1 shown in FIG. 8) of the conveying table 132 where the conveying table 132 is detached from the mouth portion 11 of the preform 10 (step 10 in FIG. 9). Steps 7 to 10 in FIG. 9 are repeated until the determination made in step 10 in FIG. 9 becomes YES. If the determination made in step 10 in FIG. 9 becomes YES, the control unit 600 controls the forward-backward drive portion 605 to drive the first conveyor arm 301 to move backward (step 11 in FIG. 9).

In this embodiment, the timing at which the first conveyor arm 301 is caused to start the normal operation in step 11 in FIG. 7 may be either before or after the first conveyor arm 301 is driven to move backward in step 11 in FIG. 9. The preform 10 on the upstream side of the straight-line running area of the heating conveyor path 120 has already been conveyed to the blow molding section 400 in the previous cycle. Thus, even if the first conveyor arm 301 is conveyed towards the blow molding section 400 before the first conveyor arm 301 is driven backward, there exists nothing which interferes with the preform being conveyed. However, it is necessary to ensure the machining stroke of the conveying table 132 so as to prevent an interference of the conveyor arm 301 which is being conveyed with the conveyor jig 130 which is situated on the upstream side of the straight-line running area.

3.2. Second Embodiment

Figure 10:
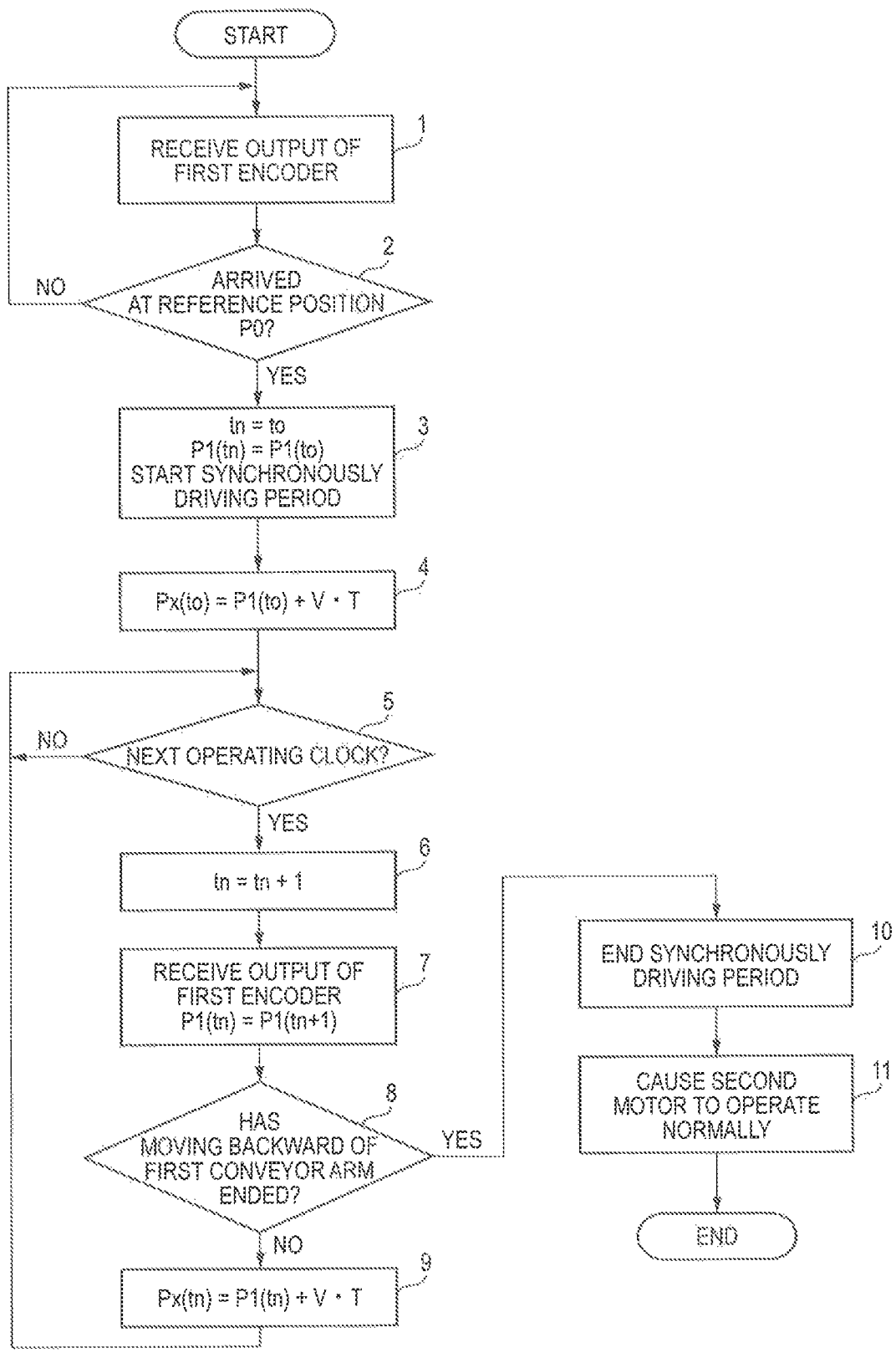
FIG. 10 is a flow chart of operations performed during the synchronously driving period and an additional synchronously driving period.

FIG. 10 is a flow chart of operations performed according to a second embodiment having a synchronously driving period T1 and an additional synchronously driving period T2. The flow chart show in FIG. 10 is the same as the flow chart shown in FIG. 7 except that the details of a control performed in step 8 differs from the control performed in step 8 in FIG. 7. In step 8 in FIG. 10, it is determined whether or not the first conveyor arm 301 has finished moving backward. In order for the determination made in step 8 in FIG. 10 to become YES, it is necessary that the first conveyor arm 301 has finished moving backward in step 11 in FIG. 9. In other words, the second embodiment has the additional synchronously driving period T2 which is a period during which the conveyor jig 130 is conveyed from the lowering position (P0+P1) of the conveying table 132 to a moving backward finishing position (the position of P0+L2 shown in FIG. 8) of the first conveyor arm 301 in addition to the synchronously driving period T1 which is the period during which the conveyor jig 130 is conveyed from the reference position P0 shown in FIG. 8 to the lowering position (P0+L1) of the conveying table 132.

In the event that the additional synchronously driving period T2, which is a period from after the end of the synchronously driving period T1 to when the first conveyor arm 301 which has received the preform 10 is moved rearward, is set, the first conveyor arm 301 is moved to face the conveyor jig 130 even while the first conveyor arm 301 is moved backward. Thus, there is no such situation that the first conveyor arm 301 which has received the preform 10 comes into interference with the following preform 10 or conveyor jig 130. In addition, since the first conveyor arm 301 which has moved backward is started to be conveyed towards the blow molding section 400, even if the preform 10 remains on a preceding conveyor jig 130 on the heating conveyor path 120, there is no such situation that the first conveyor arm 301 comes into interference with the preceding preform 10.

Here, as shown in FIG. 8, a change in speed of the conveyor jig 130 during a total period of the synchronously driving period T1 (P0 to P0+L1) and the additional synchronously driving period T2 (P0+L1 to P0+L2) is greater than a change in speed of the conveyor jig 130 during the synchronously driving period T1 (P0 to P0+L1). Due to this, a moving distance in a command outputted from the control unit 600 during the additional synchronously driving period T2 is calculated based on the average speed V of the conveyor jig 130 during the synchronously driving period T1. Even in this way, the first conveyor arm 301 can be moved to substantially face the conveyor jig 130 over the additional synchronously driving period T2 (P0+L1 to P0+L2). In short, it is required that the first conveyor arm 301 does not come into interference with the following preform 10 over the additional synchronously driving period T2 (P0+L1 to P0+L2).

While the embodiments have been described in detail heretofore, those skilled in the art to which the invention pertains will be able to understand easily that many various modifications can be made to those embodiments without departing substantially from the novel matters and advantages of the invention. Consequently, all those resulting modifications are to be included in the scope of the invention.

For example, the invention can also be applied to preform conveying devices which use other preforms than the wide-mouthed preforms or blow molding devices which blow-mold other containers than the heat-resistant containers.

While the invention has been described in detail and by reference to the specific embodiments, it is obvious to those skilled in the art to which the invention pertains that various alterations or modifications can be made thereto without departing from the spirit and scope of the invention.

This patent application is based on Japanese Patent Application No. 2014-193784 filed on Sep. 24, 2014, the contents of which are incorporated herein by reference.

REFERENCE SIGNS LIST 1 blow molding device
10 preform
11 mouth portion
12 body portion
13 flange
20 shooter
100 preform conveying device
121 sprocket
123 endless chain
120 heating conveyor path
130 conveyor jig
150 push-up mechanism
200 heating section (continuous conveyor section)
300 intermittent conveyor section
301 conveyor arm (first conveyor arm)
400 blow molding section
600 control unit
601 first motor
602 first encoder
603 second motor
604 second encoder
605 forward-backward drive portion

The invention claimed is:

1. A preform conveying device, comprising:
a continuous conveyor section that continuously conveys a conveyor jig which supports a preform along a heating conveyor path;
an intermittent conveyor section that intermittently conveys a conveyor arm between a first position and a second position along a direction which is parallel to the heating conveyor path, the preform being transferred from the conveyor jig to the conveyor arm during the conveying of the conveyor arm; and
a controller that controls the intermittent conveyor section so that the conveyor arm which was waiting in the first position can catch up with the conveyor jig, which is being conveyed continuously,
wherein the continuous conveyor section includes a first motor which applies conveying force to the conveyor jig and a first encoder which detects a rotation angle of the first motor,
wherein the intermittent conveyor section includes a second motor which applies conveying force to the conveyor arm,
wherein the controller is in communication with the first and second encoders and detects an arriving time at which the conveyor jig arrives at a reference position facing the first position based on an output of the first encoder, and commands the second motor to move the conveyor arm to a target position at regular intervals from the arriving time, the target position in each command being a position calculated by the controller by adding, to a current position of the conveyor jig which is obtained based on a latest output of the first encoder which was obtained when the command has been issued, a moving distance by which the conveyor jig has advanced during a delay time which spans from a time when the latest output is outputted from the first encoder to a time when the command is received by the second motor,
wherein the continuous conveyor section further includes:
an endless chain conveying the conveyor jig and in which a plurality of links are connected; and
a drive sprocket driven by the first motor and meshing with the endless chain, and
wherein a distance over which the endless chain moves from the reference position during a synchronously driving period, which is a period during which the conveyor arm staying in the first position is caused to catch up with the conveyor jig by the command, is set less than one fourth of a link length which is a length between supporting points of one link.

2. The preform conveying device according to claim 1, wherein the controller calculates the moving distance by multiplying a constant time corresponding to the delay time by a speed of the conveyor jig.

3. The preform conveying device according to claim 1, wherein the controller calculates the moving distance based on an average speed of the endless chain during the synchronously driving period.

4. The preform conveying device according to claim 3, wherein the conveyor jig includes a conveying table which is capable of moving up and down and which supports the preform in an inverted state where a mouth portion of the preform is facing downwards,
wherein the intermittent conveyor section includes a forward-backward drive portion which drives the conveyor arm to move forward and backward with respect to the conveying table, and
wherein a timing at which the synchronously driving period ends is set to be after the conveyor arm has been moved forward by the forward-backward drive portion to hold the mouth portion of the preform and when the conveying table is lowered.

5. The preform conveying device according to claim 4, wherein the controller controls the intermittent conveyor section during an additional synchronously driving period which is a period from after the end of the synchronously driving period to when the conveyor arm is moved backward by the forward-backward drive portion, the moving distance in a command outputted from the controller during the additional synchronously driving period being calculated based on the average speed of the endless chain during the synchronously driving period.

6. The preform conveying device according to claim 1, wherein the intermittent conveyor section further includes a second encoder for that detects a rotational angle of the second motor; and
wherein the controller starts a transfer operation of transferring the preform from the conveyor jig to the conveyor arm when a distance between a position of the transfer jig which is obtained based on a latest output from the first encoder and a position of the conveyor arm which is obtained based on a latest output from the second encoder becomes a predetermined value or smaller.

7. A blow molding device comprising:
the preform conveying device according to claim 1.

8. A preform conveying method comprising:
a first step of continuously conveying a conveyor jig which supports a preform along a heating conveyor path by using driving force of a first motor;
a second step of intermittently conveying a conveyor arm between a first position and a second position along a direction which is parallel to the heating conveyor path by using driving force of a second motor; and
a third step of transferring the preform from the conveyor jig to the conveyor arm during the conveying of the conveyor arm,
wherein the second step includes a synchronously driving step of causing the conveyor arm which was waiting in the first position to catch up with the conveyor jig which is being conveyed continuously,
wherein the synchronously driving step includes:
  a step of detecting an arriving time at which the conveyor jig arrives at a reference position facing the first position based on an output of a first encoder which detects a rotational angle of the first motor; and
  a step of commanding the second motor to move the conveyor arm to a target position at regular intervals from the arriving time,
wherein the target position in each command is a position obtained by adding, to a current position of the conveyor jig which is obtained based on a latest output of the first encoder which was obtained when the command has been issued, a moving distance by which the conveyor jig has advanced during a delay time which spans from a time when the latest output is outputted from the first encoder to a time when the command is received by the second motor,
wherein the first step of continuously conveying further includes:
  conveying the conveyor jig by an endless chain that has a plurality of connected links; and
  driving, by the first motor, a drive sprocket that meshes with the endless chain, and
wherein a distance over which the endless chain moves from the reference position during a synchronously driving period, which is a period during which the conveyor arm staying in the first position is caused to catch up with the conveyor jig by the command, is set less than one fourth of a link length which is a length between supporting points of one link.

* * * * *